(12) United States Patent
Sukigara et al.

(10) Patent No.: US 6,234,704 B1
(45) Date of Patent: May 22, 2001

(54) BALL STUD, METHOD AND APPARATUS FOR PRODUCTION THEREOF, AND BALL JOINT

(75) Inventors: Tadamasa Sukigara, Hamamatsu; Takahiro Oda, Hamana-gun, both of (JP)

(73) Assignee: Kabushiki Kaisha Somic Ishikawa (JP)

( * ) Notice: Subject to any disclaimer, the term of this patent is extended or adjusted under 35 U.S.C. 154(b) by 0 days.

(21) Appl. No.: 09/324,481

(22) Filed: Jun. 2, 1999

(30) Foreign Application Priority Data

Jun. 9, 1998 (JP) .................................................. 10-160656

(51) Int. Cl.[7] ...................................................... F16C 11/00
(52) U.S. Cl. ............................................................. 403/122
(58) Field of Search ..................................... 403/122, 124, 403/125, 126, 131, 132, 134, 50

(56) References Cited

U.S. PATENT DOCUMENTS

| | | | |
|---|---|---|---|
| 135,771 | * | 2/1873 | Burtch .................................... 403/50 |
| 2,832,223 | * | 4/1958 | Cauraud ................................. 403/50 |
| 2,884,250 | * | 4/1959 | Patterson ............................... 403/50 |
| 4,755,078 | * | 7/1988 | Blumberg et al. ................. 403/50 X |
| 5,704,726 | * | 1/1998 | Nemoto ............................ 403/132 X |
| 5,752,780 | * | 5/1998 | Dorr ................................. 403/122 X |

\* cited by examiner

*Primary Examiner*—Lynne H. Browne
*Assistant Examiner*—John R. Cottingham
(74) *Attorney, Agent, or Firm*—Morrison Law Firm

(57) ABSTRACT

A ball stud has a buckle portion designed to buckle under an appropriate amount of longitudinal pressure. The buckle portion is formed by a rolling process resulting in furrowed portions and raised portions integrally formed in an accordion shape along a portion of the ball stud. The raised portions are formed from the surplus material displaced from forming the furrowed portions. The buckling strength is variable depending on the number of furrowed portions and raised portions in the ball stud. A ball head, connected to the ball stud is inserted into an opening of a housing. The process of making the ball stud requires minimal pressure in the rolling process, resulting in reduced production costs and roller wear.

2 Claims, 3 Drawing Sheets

BALL STUD, METHOD AND APPARATUS FOR PRODUCTION THEREOF, AND BALL JOINT

BACKGROUND OF THE INVENTION

The present invention relates to a ball stud having a buckle portion adapted to buckle under an external stress. The present invention also relates to a method and an apparatus for producing the ball stud. The present invention further relates to a ball joint including such a ball stud.

Conventional methods of producing a ball stud, including a buckle portion adapted to buckle under an external stress, are disclosed in Japanese Patent Laid-open No. 1994-55237.

The ball stud production method disclosed in Japanese Patent Laid-open No. 1994-55237 produces a ball stud of a ball joint which is used as a steering mechanism in a steering system of an automobile. The conventional production method forms a buckle portion by swaging or rolling the portion of a bar-shaped material intended for buckling. The resulting buckle portion of the bar-shaped material is reduced in diameter by a predetermined percentage. The material to be processed is formed into a bar beforehand by cold forging.

The ball stud production method disclosed in Japanese Patent Laid-open No. 1994-55237 requires a heavy load to squeeze the bar-shaped material to form a buckle portion having an axial length sufficient for buckling. Since the buckle portion is formed by merely squeezing the rolling bar-shaped material, a heavy load is necessary. Such a heavy load not only requires a large processing machine, but also reduces the life span of the roller or processing jigs, requiring the frequent replacement of these jigs. The problems associated with the conventional method of ball stud production make the manufacture of the ball stud difficult, which consequently increases the production costs.

OBJECTS AND SUMMARY OF THE INVENTION

It is an object of the present invention to provide a ball stud production method which overcomes the foregoing problems.

It is a further object of the present invention to provide a ball stud production apparatus which overcomes the foregoing problems.

It is still a further object of the present invention to provide a ball stud having an easily formed buckle portion.

Briefly stated, the present invention provides a ball stud having a buckle portion designed to buckle under an appropriate amount of longitudinal pressure. The buckle portion is formed by a rolling process resulting in furrowed portions and raised portions integrally formed in an accordion shape along a portion of the ball stud. The raised portions are formed from the surplus material displaced from forming the furrowed portions. The buckling strength is variable depending on the number of furrowed portions and raised portions in the ball stud. A ball bead, connected to the ball stud is inserted into an opening of a housing. The process of making the ball stud requires minimal pressure in the rolling process, resulting in reduced production costs and roller wear.

According to an embodiment of the present invention, there is provided a ball stud comprising a ball head portion, a stud portion, the ball head portion integrally formed on one end of the stud portion, a buckle portion included in at least a portion of the stud portion, the buckle portion buckling under an appropriate amount of external longitudinal stress, the buckle portion having alternately arranged furrowed portions and raised portions extending in an axial direction along the portion, the furrowed portions having minimum diameters that are smaller than a remainder of the stud portion, the raised portions having maximum diameters that are larger than a remainder of the stud portion by displacement of material from the furrowed portions, and a number of the furrowed portions and the raised portions being effective to provide a desired buckling strength.

According to another embodiment of the present invention, there is provided a ball joint comprising a ball head portion, a stud portion having the ball head portion integrally formed at one thereof, a buckle portion in a portion of the stud portion, the buckle portion having a strength effective to permit buckling under an appropriate amount of external longitudinal stress, the buckle portion having alternately arranged furrowed portions and raised portions extending in an axial direction along the portion, the furrowed portions having minimum diameters that are smaller than a remainder of the stud portion, the raised portions having maximum diameters that are larger than a remainder of the stud portion by displacement of material from the furrowed portions, a number of the furrowed portions and the raised portions being effective to provide a desired buckling strength, a housing having an inner chamber, the inner chamber having an opening at one end thereof, and the ball head portion slidably movable in the inner chamber.

According to a further embodiment of the present invention, there is provided a method of making a ball stud having a ball head portion integrally formed on one end of a stud portion comprising rolling a portion of the stud portion to form a buckle portion, the buckle portion having alternately arranged furrowed portions and raised portions extending in an axial direction along the portion, and the furrowed portions having minimum diameters that are smaller than a remainder of the stud portion, the raised portions having maximum diameters that are larger than a remainder of the stud portion by displacement of material from the furrowed portions, and a number of the furrowed portions and the raised portions being effective to provide a desired buckling strength.

According to another embodiment of the present invention, there is provided an apparatus for producing a ball stud having a ball head portion and a stud portion comprising at least first and second buckle forming members each having an outer surface adapted to contact an outer surface of the stud portion, the outer surface having furrow-forming portions and groove-shaped material-raising portions, and the furrow-forming portions and the material-raising portions alternately arranged to form an accordion shape.

The above, and other objects, feature and advantages of the present invention will become apparent from the following description read in conjunction with accompanying drawings, in which like reference numerals designate the same element.

DETAILED DESCRIPTION ON THE INVENTION

Figure 2:
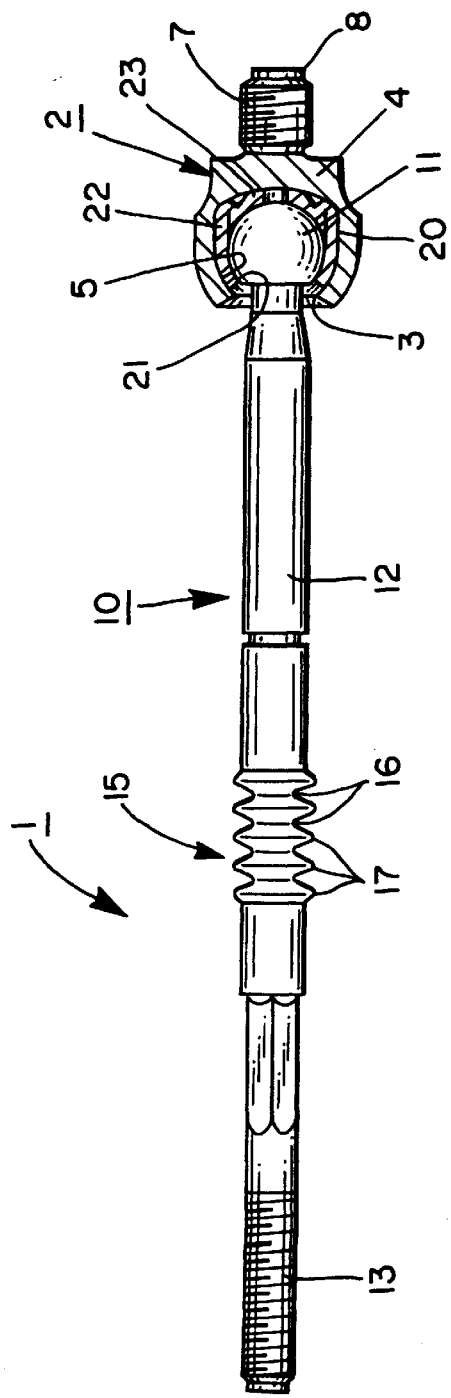
FIG. 2 is a partially cutaway sectional view of a ball joint including said ball stud.

Referring to FIG. 2, a ball joint 1, useful as a steering mechanism of a steering system of an automobile, includes a metal housing 2 and a metal ball stud 10. An opening 3 is located at one end of metal housing 2. A bottom portion 4 is located opposite opening 3. Housing 2 has a generally cylindrical shaped inner chamber 5. A coupling portion 8 projects from approximately the center of an underside of bottom portion 4 of housing 2. Coupling portion 8 extends in an axial direction opposite ball stud 10. An external threaded portion 7 is formed on an outer cylindrical surface of coupling portion 8 for connection to the remainder of a vehicle (not shown).

Figure 1:
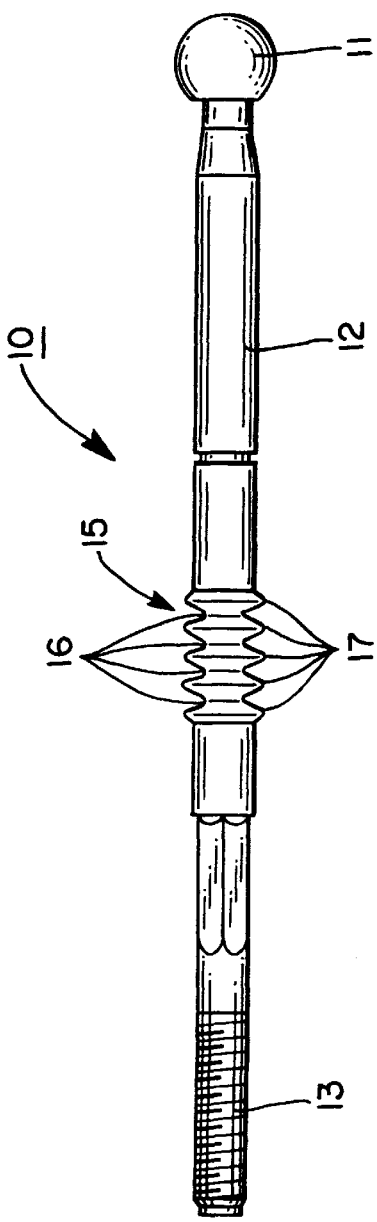
FIG. 1 is a side view of a ball stud according to an embodiment of the present invention.

Referring to FIGS. 1 and 2, metal ball stud 10 attaches to housing 2. Metal ball stud 10 includes a metal ball head portion 11 integrally formed at an end of a stud portion 12. Ball head portion 11 is positioned in inner chamber 5 of housing 2. Stud portion 12 projects from opening 3 of housing 2. An external threaded portion 13 is formed at the end of stud portion 12.

A buckle portion 15, extending in an axial direction of metal ball stud 10, is formed by a rolling process. Buckle portion 15 is formed around an outer cylindrical face in a central region of stud portion 12. Buckle portion 15 has a plurality of furrowed portions 16, each having the shape of a groove extending around the circumference of stud portion 12. Buckle portion 15 has a plurality of raised portions 17, each having the shape of a sloped wall extending around the circumference of stud portion 12. Furrowed portions 16 are interposed between raised portions 17 to form a continuous integral body having an accordion shape. Furrowed portions 16 and raised portions 17 are alternately arranged side by side along the axial direction to form a continuous wave. The minimum diameter of each furrowed portion 16 is smaller than the minimum diameter of the portions of stud portion 12 located outside buckle portion 15 (the portions where no buckle portion is formed). The maximum diameter of each raised portion 17 is greater than the maximum diameter of the portions of stud portion 12 located outside buckle portion 15.

A ball seat 20, preferably formed of a synthetic resin, is disposed between an inner wall surface of inner chamber 5 of housing 2 and an outer surface of ball head portion 11 of ball stud 10. Ball seat 20 has a generally cylindrical shaped body portion 22, with a bottom and an insertion hole 21 located at an end of body portion 22. The location of insertion hole 21 corresponds to the location of opening 3 of housing 2. Thus, body portion 22 is adapted to contain ball head portion 11 of ball stud 10 with ball head portion 11 easily sliding on an inner surface of body portion 22. Stud portion 12 of ball stud 10 projects from insertion hole 21. A seating portion 23, at the bottom of body portion 22, comes into contact with an inner face of bottom portion 4 of housing 2 when ball joint I is assembled.

Figure 3:
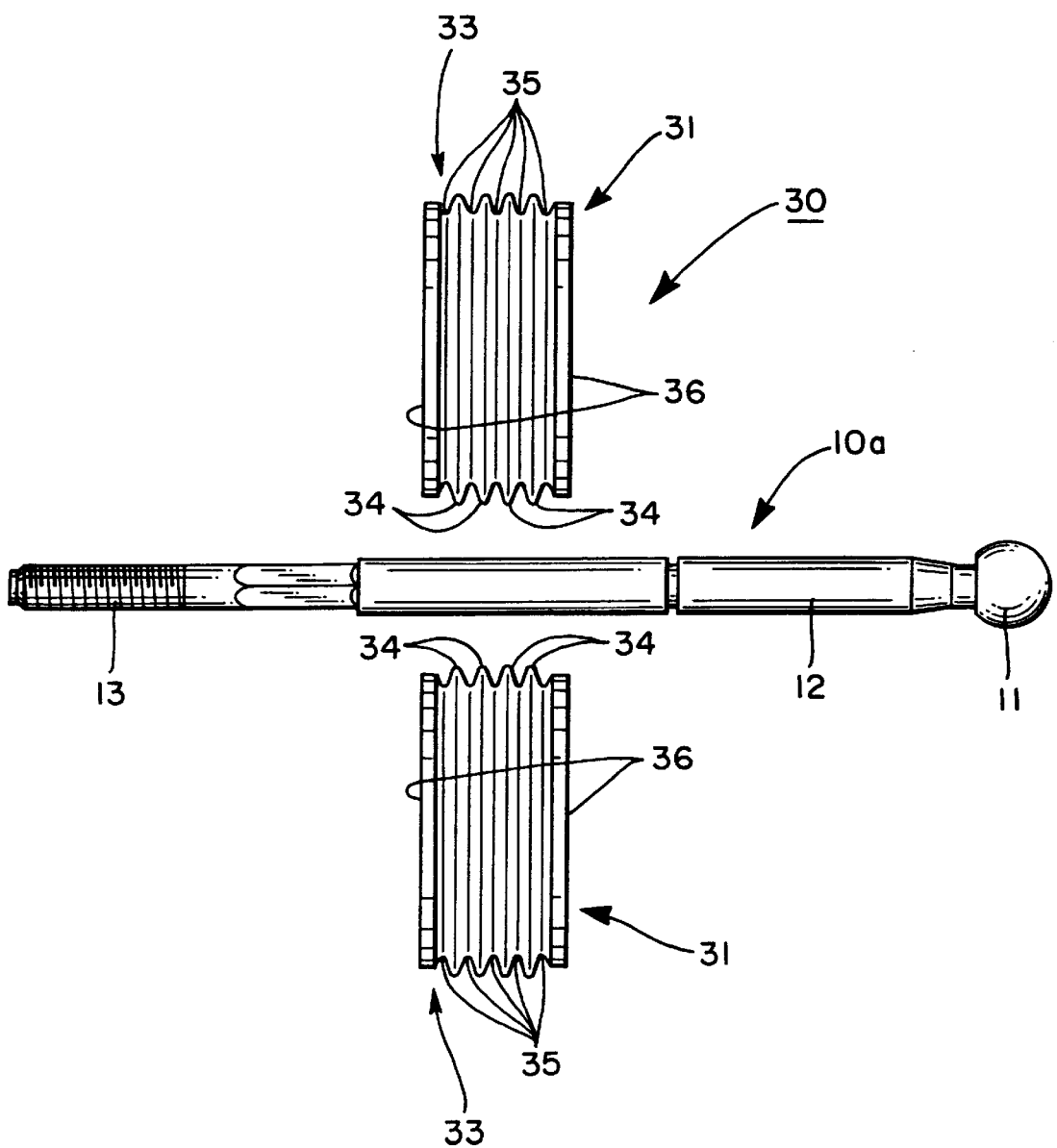
FIG. 3 is a schematic illustration to which reference will be made in explaining the manner of forming the buckle portion of said ball stud by rolling process.

Referring to FIGS. 2 and 3, buckle portion 15 is formed on ball joint 1 by using a rolling machine 30. Rolling machine 30 includes a pair of generally cylindrical rollers 31, serving as rolling members, and a stopper (not shown) adapted to come into contact with ball head portion 11, holding ball head portion 11 at a given position. Rollers 31 are rotatably arranged with their axes extending nearly parallel to each other. Outer cylindrical surfaces 36 of rollers 31 are separated from each other by a specified distance. At least one of rollers 31 is adjustable to increase or reduce the distance between outer cylindrical surfaces 36 of rollers 31.

Figure 4:
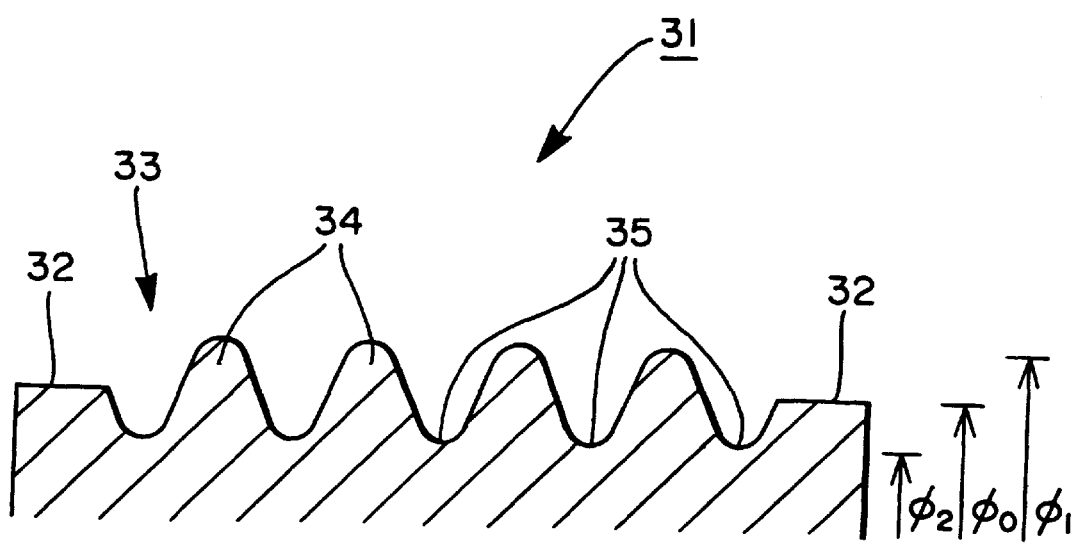
FIG. 4 is an expanded sectional view of part of the buckle forming portion of a roller of the apparatus shown in FIG. 3.

Referring to FIGS. 3 and 4, an axially extending, accordion-shaped buckle forming portion 33 is formed on an outer cylindrical wall of rollers 31. Buckle forming portion 33 is located at approximately the center of each roller 31. Flat faces 32 are located at each of the axial ends of each roller 31. Buckle forming portion 33 has a plurality of furrow-forming portions 34, each having a shape of a sloped wall extending around the circumference of buckle forming portion 33. Furrow-forming portions 34 form furrowed portion 16 of buckle portion 15 of ball stud 10. Buckle forming portion 33 also has a plurality of material-raising portions 35, each of which has a shape of a groove extending around the circumference of buckle forming portion 33. Material-raising portions 35 form raised portions 17 of buckle portion 15 of ball stud 10. Furrow-forming portions 34 and material-raising portions 35 are alternately arranged side by side along the axial direction to form a continuous wave. Buckle forming portion 33 is formed with its minimum diameter $\phi_2$, i.e. the diameter at the bottom of each material-raising portion 35, smaller than the minimum diameter $\phi_0$ of each portion where flat face 32 is located. The maximum diameter $\phi_1$ of buckle forming portion 33, i.e. the diameter at the top of each furrow-forming portion 34, is greater than the maximum diameter $\phi_0$ of each portion where flat face 32 is located.

A base member 10a, to be formed into ball stud 10, is positioned on rolling machine 30 by bringing ball stud base member 10a into contact with the stopper (not shown). Ball stud base member 10a is positioned between the pair of rollers 31 with the axis of ball stud base member 10a extending nearly parallel to those of rollers 31. Ball stud base member 10a is then processed by rotating rollers 31.

More specifically, while rotating both rollers 31, one of rollers 31 is moved toward the other roller 31, sandwiching ball stud base member 10a therebetween. In this state, ball stud base member 10a is also rotated so that rollers 31,31 rotate against an outer circumferential surface of ball stud base member 10a. As a result, the rolling furrow-forming portions 34 of rollers 31 form the aforementioned furrowed portions 16. The surplus material produced as a result of the formation of furrowed portions 16 is pushed to material-raising portions 35, i.e. the spaces located at both sides of each furrow-forming portion 34. Material-raising portions 35 permit the surplus material to rise on an outer circumferential surface of ball stud base member 10a. Each furrowed portion 16 is flanked by two brim-shaped raised portions 17. Raised portions 17 extend along the two edges of each furrowed portion 16 to form an integral, continuous body with furrowed portion 16. Thus, raised portions 17 are formed under the pressure of rollers 31 without the danger of forming cracks. When flat faces 32 of rollers 31 come into contact with an outer circumferential surface of stud portion 12, the rolling operation stops, completing the formation of the accordion-shaped buckle portion 15 extending in the axial direction of ball stud 10.

Buckle portion 15 can be formed so as to give ball stud 10 different buckling strength by changing the numbers of furrow-forming portions 34 and material-raising portions 35. For example, ball stud 10 can be designed to have reduced buckling strength by forming buckle portion 15 with rollers 31 having a greater number of furrow-forming portions 34 and material-raising portions 35. Ball stud 10 can be designed to have a greater buckling strength by forming buckle portion 15 with rollers 31 which have fewer furrow-forming portions 34 and material-raising portions 35.

According to the embodiment described above, there is no need for changing the depth of furrowed portions 16 or the axial length of ball stud 10 to set the buckling strength. The buckling strength is changed by changing the number of furrow-forming portions 34 and material-raising portions 35. Therefore, this embodiment of the present invention is more convenient to produce ball studs, since it is capable of reducing the amount of processing operation necessary to form furrowed portions 16 that have sufficient capability of buckling.

As described above, this embodiment of the present invention calls for forming buckle portion 15 of ball stud 10 in the shape of an accordion that extends in the axial direction. Buckle portion 15 has groove-like furrowed portions 16 extending around the circumference of ball stud 10. Buckle portion 15 also has raised portions 17, having the shape of a sloped wall extending around the circumference wall of ball stud 10. Raised portions 17 are arranged integrally and alternately with furrowed portions 16 along the axial direction. Each raised portion 17 is formed from the surplus material that has been forced out of furrowed portions 16 as furrowed portions 16 are formed. The surplus material is easily moved out from furrowed portions 16 during their formation. Therefore, the ball stud 10 of the present invention is capable of reducing the load required to produce furrowed portions 16, having a total axial length sufficient for permitting the buckling of ball stud 10. This feature of ball stud 10 not only enables the reduction of the dimensions of rolling machine 30, but also increases the life span of rollers 31 by reducing the load applied to rollers 31. This increase in the life span of rollers 31 facilitates the maintenance of rolling machine 30. Rolling machine 30 provides an easy way to form buckle portion 15, thereby improving the ease of manufacture of ball studs and reducing their production costs.

Facilitating the formation of buckle portion 15 does not impair the function of ball stud 10. Furrowed portions 16, where the diameter of stud portion 12 is at its minimum, ensure ball stud 10 will buckle at buckle portion 15 when a sufficient buckling pressure is applied.

Furthermore, buckle portion 15 is formed with the minimum diameter of furrowed portions 16 smaller than the minimum diameter of the portions of stud portion 12 located outside buckle portion 15. The maximum diameter of raised portions 17 is greater than the maximum diameter of the portions of stud portion 12 which are not provided with buckle portion 15. Therefore, the present invention is capable of improving the ease of manufacture of ball studs by reducing the amount of processing necessary to form furrowed portions 16 which have sufficient capability of buckling.

This embodiment of the present invention enables ball stud 10 to have a desired buckling strength by forming buckle portion 15 with an appropriate number of furrowed portions 16 and raised portions 17. By only changing the number of furrowed portions 16 and raised portions 17, while maintaining the same pitch, the difference in quality of ball studs 10 having different buckling strengths is minimized. Thus, ball studs having uniform quality while facilitating the change of the buckling strength are easily manufactured.

While the invention is explained referring to the above embodiment, which concerns the structure of ball joint 1 useful in a steering device of a steering system, the invention is applicable to a ball joint of any type.

According to the above embodiment of the present invention, buckle portion 15 is formed using cylindrical rollers 31. However, in another embodiment of the present invention, a rolling machine, having a pair of plate-shaped rolling members arranged nearly parallel to each other providing furrow-forming portions 34 and material-raising portions 35, is used to form buckle portion 15. At least one of the rolling members are capable of vertically moving while remaining parallel to each other. Buckle portions 15 are then formed by disposing and rolling ball stud 10 between the rolling members.

In another embodiment of the present invention, a single furrowed portion 16 interposed between two raised portions 17 is provided to form buckle portion 15. Alternatively, a single raised portion 17 interposed between two furrowed portions 16 is provided to form buckle portion 15. In other words, given that the number of furrowed portion(s) 16 and raised portion(s) 17 are m and n respectively, the conditions required by the present invention is represented by the equation n=m+1 or m=n+1, wherein n and m are both natural numbers.

Furthermore, furrowed portion(s) 16 and raised portion(s) 17 may be formed at any location between threaded portion 13 and the bottom of a neck portion, which is the portion between ball head portion 11 and stud portion 12. After forming furrowed portions 16 and raised portions 17, one or more additional sets of furrowed portions 16 and raised portions 17 may be formed between the neck portion and threaded portion 13.

According to an embodiment of the present invention, the configuration of ball stud 10 includes buckle portion 15 having an accordion shape extending in the axial direction. Buckle portion 15 is formed on an outer circumferential surface of stud portion 12 of ball joint 1 with furrowed portions 16 arranged integrally and alternately with raised portions 17. The surplus material produced as a result of the rolling formation of furrowed portions 16 is easily moved out of furrowed portions 16. Therefore, the invention reduces the load required to produce furrowed portions 16 of buckle portion 15. The present invention provides for a reduction of the size of the equipment necessary for the formation of a buckling ball stud. Furthermore, the present invention results in an increased life span for the buckle portion rolling apparatus. The ease of manufacture of ball studs by the method of the present invention is greater than that of conventional methods. Thus, the cost of producing such a ball stud is significantly reduced.

According to another embodiment of the present invention, the minimum diameter of furrowed portions 16, where the diameter of buckle portion 15 is at its minimum, is smaller than the minimum diameter of the remaining portions of stud portion 12, where no buckle portion 15 portion 15 is present. The maximum diameter of raised portions 17, where the diameter of buckle portion 15 is at its maximum, is greater than the maximum diameter of the remaining portions of stud portion 12, where no buckling portion is present. Therefore, a ball stud according to this embodiment of the invention is further capable of reducing the amount of processing operation necessary to form furrowed portions 16 having sufficient capability of buckling, thereby further improving the ease of manufacture of ball stud 10.

According to another embodiment of the present invention, a desired buckling strength is obtained by providing an appropriate number of furrowed portions 16 and raised portions 17 for forming buckle portion 15. Therefore, a ball stud according to this embodiment of the present invention is capable of maintaining uniform quality of products while permitting the buckling strength to be easily changed.

According to another embodiment of the present invention, ball head portion 11 of ball stud 10 is slidably contained in inner chamber 5 of housing 2. Inner chamber 5 has an opening 3 at one end thereof. Therefore, ball joint 1, according to this embodiment of the present invention, is more convenient to produce at reduced production costs.

According to a method of producing ball stud 10, buckle portion 15, having an accordion shape extending in the axial direction of ball stud 10, is formed on an outer circumferential surface of stud portion 12 of ball joint 1. Furrowed portions 16, extending around the outer wall of stud portion 12, are formed in ball stud 10 by a rolling process. Raised portions 17, extending around the outer wall of stud portion 12, are formed in ball stud 10 by piling up a surplus portion of the material on either one of or both sides of each furrowed portion 16. The surplus material is easily flowed during the rolling process, forming buckle portion 15 with a minimal required load., thereby facilitating the formation of buckle portion 15. Furthermore, the rolling apparatus of the present invention has a reduced size and an increased life span, thereby reducing the overall cost of producing ball stud 10.

According to another embodiment for producing ball stud 10, the minimum diameter of furrowed portions 16, where the diameter of buckle portion 15 is at its minimum, is made smaller than the minimum diameter of the remaining portions of stud portion 12, where no buckle portion 15 is present. The maximum diameter of raised portions 17, where the diameter of buckle portion 15 is at its maximum, is made larger than the maximum diameter of the remaining portions of stud portion 12, where no buckling portion is present. Therefore, a ball stud made according to this embodiment of the invention is further capable of reducing the amount of processing operation necessary to form furrowed portions 16 having sufficient capability of buckling, thereby further improving the ease of manufacture of ball stud 10.

According to another embodiment for producing ball stud 1, a desired buckling strength is obtained by providing an appropriate number of furrowed portions 16 and raised portions 17 for forming buckle portion 15. Therefore, a ball stud produced according to this embodiment of the present invention is capable of maintaining uniform quality of products while permitting the buckling strength to be easily changed.

According to an apparatus for producing ball stud 10 of the present invention, buckle forming portion 33 of each rolling member 31 is formed on an outer surface of rolling member 31. Rolling members 31, which come into contact with stud portion 12 of ball stud 10, include flat faces 32 extending on at least one side of furrow-forming portions 34 and material-raising portions 35. In the above configuration, the amount of processing operation for forming buckle portion 15 is determined by adjusting the apparatus to operate until flat faces 32 come into contact with an outer circumferential surface of stud portion 12 of ball stud 10. In other words, the height of furrow-forming portions 34 and the depth of material-raising portions 35 is easily set by using flat faces 32 as a gauge.

According to another embodiment of an apparatus for producing a ball stud 10 of the present invention, material-raising portions 35 are recessed with respect to the surface of flat faces 32. Furrow-forming portions 34 protrude from the plane that is flush with flat faces 32. Therefore, the apparatus according to this embodiment of the present invention is capable of reducing the amount of processing operation necessary to form furrowed portions 16 having sufficient capability for enabling buckling of ball stud 10, thereby improving the ease of manufacture of ball stud 10.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball stud comprising:

a ball head portion;

a stud portion;

said ball head portion integrally formed on one end of said stud portion;

a buckle portion included in at least a portion of said stud portion;

said buckle portion buckling under an appropriate amount of external longitudinal stress;

said buckle portion having alternately arranged furrowed portions and raised portions extending in an axial direction along said portion;

said furrowed portions having minimum diameters that are smaller than a remainder of said stud portion;

said raised portions having maximum diameters that are larger than a remainder of said stud portion by displacement of material from said furrowed portions; and a number of said furrowed portions and said raised portions being effective to provide a desired buckling strength.

2. A ball joint comprising:

a ball head portion;

a stud portion having said ball head portion integrally formed at one thereof;

a buckle portion in a portion of said stud portion;

said buckle portion having a strength effective to permit buckling under an appropriate amount of external longitudinal stress;

said buckle portion having alternately arranged furrowed portions and raised portions extending in an axial direction along said portion;

said furrowed portions having minimum diameters that are smaller than a remainder of said stud portion;

said raised portions having maximum diameters that are larger than a remainder of said stud portion by displacement of material from said furrowed portions;

a number of said furrowed portions and said raised portions being effective to provide a desired buckling strength;

a housing having an inner chamber;

said inner chamber having an opening at one end thereof; and said ball head portion slidably movable in said inner chamber.

* * * * *